(12) United States Patent
Uchizawa

(10) Patent No.: US 11,281,178 B2
(45) Date of Patent: Mar. 22, 2022

(54) CONTROLLING APPARATUS FOR INDUSTRIAL PRODUCTS

(71) Applicant: DENSO WAVE INCORPORATED, Chita-gun (JP)

(72) Inventor: Riho Uchizawa, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 17/008,836

(22) Filed: Sep. 1, 2020

(65) Prior Publication Data

US 2021/0157291 A1 May 27, 2021

(30) Foreign Application Priority Data

Nov. 27, 2019 (JP) .............................. JP2019-214210

(51) Int. Cl.
*G06F 11/30* (2006.01)
*G05B 19/042* (2006.01)
*G06F 9/30* (2018.01)
*G06F 9/26* (2006.01)
*G06F 11/16* (2006.01)

(52) U.S. Cl.
CPC ......... *G05B 19/0428* (2013.01); *G06F 9/268* (2013.01); *G06F 9/30112* (2013.01); *G06F 11/1629* (2013.01); *G05B 2219/24053* (2013.01)

(58) Field of Classification Search
CPC .. G06F 11/1629; G06F 9/30112; G06F 9/268; G06F 9/46; G05B 19/0428; G05B 2219/24053; G05B 2219/24187
See application file for complete search history.

(56) References Cited

U.S. PATENT DOCUMENTS

| 8,839,029 | B2 * | 9/2014 | Yamada ................. | G06F 11/004 |
| | | | | 714/11 |
| 10,248,492 | B2 * | 4/2019 | Mariani .............. | G06F 11/3688 |
| 2006/0149903 | A1 * | 7/2006 | Sugimoto ........... | G06F 11/1658 |
| | | | | 711/127 |
| 2019/0278677 | A1 * | 9/2019 | Terechko ............ | G06F 11/2242 |

FOREIGN PATENT DOCUMENTS

JP H06-335756 A 12/1994

* cited by examiner

*Primary Examiner* — Matthew M Kim
*Assistant Examiner* — Kyle Emanuele
(74) *Attorney, Agent, or Firm* — Oliff PLC

(57) ABSTRACT

The controlling apparatus for an industrial product of this disclosure has a couple of microcomputers each of which has a CPU and a memory and each of which runs the same controlling program as well as the same diagnostic program sequence parallelly and simultaneously. After the CPU of the microcomputer writes the calculated result of the diagnostic program sequence in the predetermined area of the storing area for monitoring value, such CPU send the same calculated result to the other one of the microcomputers (receiving microcomputer). The CPU of the receiving microcomputer makes a diagnosis for finding whether or not the received result is identical with its own calculated result.

2 Claims, 7 Drawing Sheets

FIG.3

```
int main() {
  init();
  FuncA();
  FuncB();
  FuncC();
}
```

```
void init() {
  menset(mon, 1, 16);
}
void FuncA() {
  ...
  ProSeq[0][0] *= 1;
  ...
  ProSeq[0][1] *= 2;
  ...
  ProSeq[0][2] *= 3;
}
void FuncB() {
  ...
  ProSeq[1][0] += 1;
  ...
  ProSeq[1][1] += 2;
  ...
  ProSeq[1][2] += 3;
}
void FuncC() {
  ...
  ProSeq[2][0] *= 4;
  ...
  ProSeq[2][1] *= 5;
  ...
  ProSeq[2][2] *= 6;
}
```

| [0][0] | [0][1] | [0][2] | [0][3] |
| [1][0] | [1][1] | [1][2] | [1][3] |
| [2][0] | [2][1] | [2][2] | [2][3] |
| [3][0] | [3][1] | [3][2] | [3][3] |

CONTROLLING APPARATUS FOR INDUSTRIAL PRODUCTS

CROSS-REFERENCE TO RELATED APPLICATION

This application is based on and claims the benefit of priority from earlier Japanese Patent Application No. 2019-214210 filed Nov. 27, 2019, the description of which is incorporated herein by reference.

BACKGROUND

1. Technical Field

The present disclosure relates to a controlling apparatus for an industrial product. The controlling apparatus uses a couple of microcomputers both runs the same controlling program simultaneously.

2. Related Art

A programmable controller used for the controlling apparatus for the industrial product may use a couple of microcomputers for ensuring functional safety thereof. Such a couple of microcomputers run the same controlling program parallelly and simultaneously and the industrial product as a controlled object is controlled when the two commands from a couple of microcomputers satisfy the logical AND.

Each of the programmable controller of a couple of microcomputers has the diagnostic function on a CPU as a main resource of each microcomputer and its related circuits such as a memory, a clock circuit, A/D convertor, and so on.

SUMMARY

The diagnostic function for the CPU gives a diagnosis on the program sequence whether or not the same runs correctly and on the hardware for accessing the memory whether or not the same works correctly. However, since the both microcomputers make a diagnosis respectively, the time for the diagnostic on the both microcomputers should take longer, and the memory capacity should be greater.

The object of the present disclosure is to provide the controlling apparatus for the industrial product having the effective diagnostic function such as for program sequence and/or the hardware for accessing to the memory.

As to the first disclosure, each of a couple of microcomputers has a CPU and a memory and runs the same controlling program as well as the same diagnostic program sequence parallelly and simultaneously. When the CPU of each of the microcomputers writes a calculated result of the diagnostic program sequence in a predetermined area of a storing area for monitoring value in the memory, such calculated result is sent to a receiving one of the two (2) microcomputers. The CPU of the receiving microcomputer compares received calculated result to its own calculated result stored in the predetermined area of the storing area for monitoring value of the memory in order to make a diagnostic function.

Accordingly, in the case if the CPU of the receiving microcomputer detects the received result is identified with the calculated result by the receiving microcomputer, the receiving microcomputer could decide both of the diagnostic program sequence of the CPU and the hardware for accessing the memory work effectively and correctively. The hardware includes an address decoder, an address of the memory when the CPU accesses the same, a data bus and the memory. On the other hand, in the case if the received result is different from its own calculated result, the receiving microcomputer detects the error. When the CPU of the receiving microcomputer fines that such difference is positioned only a part of the storing area for monitoring value, such difference could be occurred by the hardware, and when the CPU of the receiving microcomputer fines that such difference locates in the continuing address, such difference could be occurred by the calculation of the diagnostic program sequence.

As to the second disclosure, the capacity of the memory is $4^n$ bytes, where "n" is natural number. Namely, the storing area could be two (2) dimensional arrangement such as 2×2, 4×4, 8×8, and etc. Therefore, the CPU could make a diagnosis entirely from an MSB (Most Significant Bit) to an LSB (Last Significant Bit).

As to the third disclosure, the diagnostic program sequences making a diagnosis are varied every $4^n$ bytes of the storing area for monitoring value, so that the diagnostic program sequence could become diverse. The definition of "varied every $4^n$ bytes" is the program sequence of following $4^n$ bytes is different from the program sequence of the precedent $4^n$ bytes. Accordingly, every program sequence does not have to be different each other.

BRIEF DESCRIPTION OF THE DRAWINGS

FIG. 3 is a chart explaining a relationship between each equation of a diagnostic program sequence and each value installed in a storing area for monitoring value.

DETAILED DESCRIPTION OF THE PREFERRED EMBODIMENTS

Figure 1:
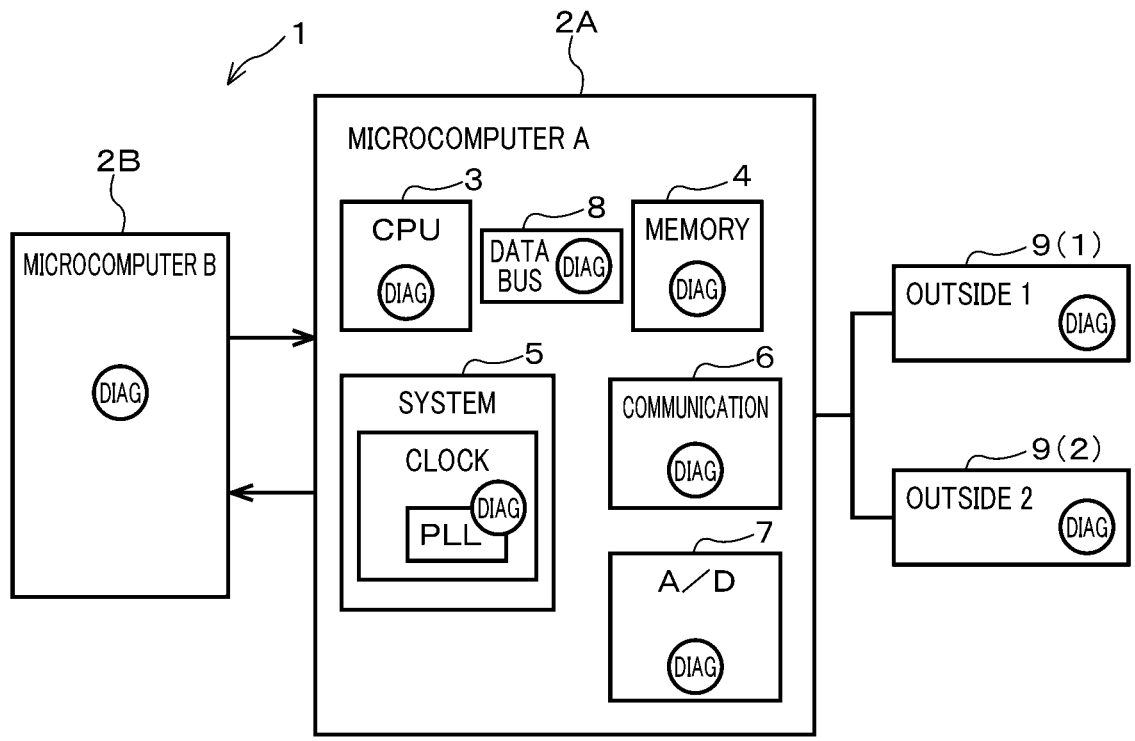
FIG. 1 is a block diagram showing essential function of one example of PLC (Programmable Logic Controller).

A preferred embodiment of the present description is explained by referring drawings hereinafter. FIG. 1 is a block diagram showing essential function of an example of PLC 1 (Programmable Logic Controller). The PLC 1 has a couple of microcomputers 2A and 2B those are arranged in miller image. Each microcomputer 2A and 2B, stating together as a microcomputer 2, has a CPU 3, a memory 4, a system clock circuit 5, a communication circuit 6 and an A/D invertor 7. Though the CPU 3 and the other devices 4-7 are connected by a data bus 8, FIG. 1 shows only a part of the data bus 8 connecting the CPU 3 and the memory 4. The microcomputer 2 is connected to an outside circuit 9(1) and an outside circuit 9(2).

"Diag" in the blocks means making a diagnosis in each device while PLC 1 works. Each of a couple of microcomputers 2A and 2B runs a controlling program simultaneously so that the PLC 1 and a controlled apparatus such as an industrial product is controlled by a logical AND of the controlling program of the microcomputer 2A and the microcomputer 2B. A program sequence for the diagnostic function is carried out within the time space of the controlling program.

Figure 2:
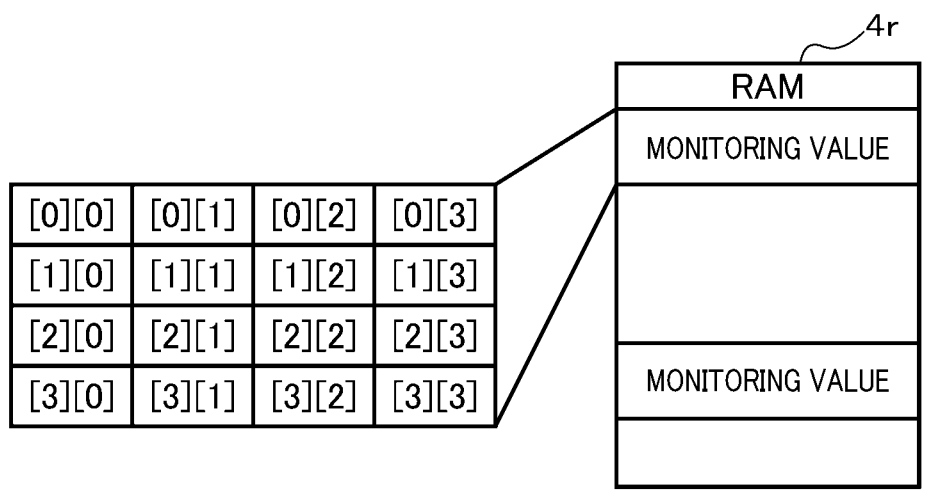
FIG. 2 is a chart explaining a storing area for monitoring value set in a part of a RAM.

The mutual diagnostic between the microcomputer 2A and the microcomputer 2B is explained hereinafter. As shown in FIG. 2, a sequence monitor value which is the result of the diagnostic program sequence is set in a storing area of the RAM 4r of the memory 4. As this storing area corresponds the object area, this storing area is called "storing area for monitoring value" hereinafter. In the case the size of the data bus is 32 bits, the storing area for monitoring value is 16 bytes and arranged as the two dimensional arrangement of 4 by 4, namely, N=2 of $4^n$.

As shown in FIG. 3 as one example, microcomputer 2 runs the diagnostic program sequence and the result of monitoring value is installed in the storing area for monitoring value. Though the example of FIG. 3 describes three (3) equations of Func A, Func B and Func C as a main function, FIG. 3 shows only a part of equations. In FIG. 3, the storing area for monitoring value is describes as "menset (mon,1,16)" and is kept as the area of 16 bytes.

The result of the equation FuncA which is multiple the value in [0][0]-[0][3] of the storing area for monitoring value by the value of 1, 2, 3 and 4 is installed in [0][0]-[0][3] of the storing area for monitoring value.

The result of the equation FuncB which is multiple the value in [1][0]-[1][3] of the storing area for monitoring value by the value of 1, 2, 3 and 4 is installed in [1][0]-[1][3] of the storing area for monitoring value.

The result of the equation FuncC which is multiple the value in [2][0]-[2][3] of the storing area for monitoring value by the value of 4, 5, 6 and 7 is installed in [2][0]-[2][3] of the storing area for monitoring value.

Accordingly, the diagnostic program sequence shown in FIG. 3 carries out different equations by each of four (4) bytes in the storing area for monitoring value.

After the diagnostic program sequence is completed, the microcomputer 2A sends the data value in the storing area for monitoring value to the microcomputer 2B and the microcomputer 2B sends the data value to the microcomputer 2A. Each of the microcomputer 2A and the microcomputer 2B makes a diagnosis whether the receiving data in the storing area for monitoring value is corresponding to the data value calculated by itself.

Figure 4:
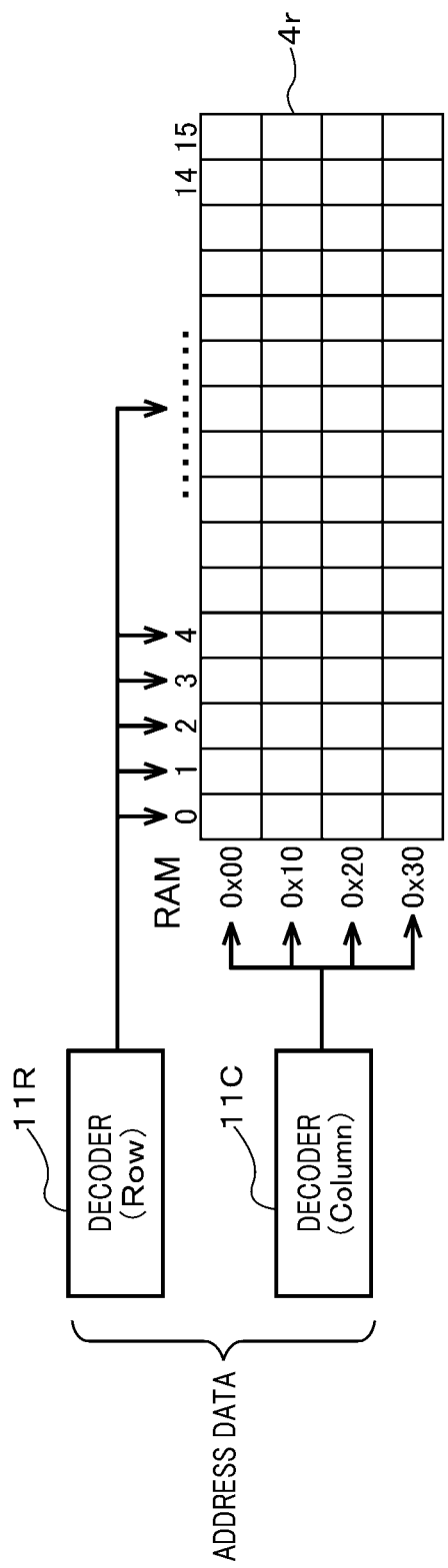
FIG. 4 is a chart explaining a relationship between an address decoder and an address of a RAM.

As shown in FIG. 4, the address data from the CPU 3 are decoded by a Row side decoder 11R and a Column side decoder 11C for accessing RAM 4r, such detailed is not described in FIG. 1 Though the table of FIG. 4 has sixteen (16) bytes in the Row side decoder and four (4) bytes in the Column side decoder, four (4) by four (4) table could be used. The Row side decoder 11R decodes a predetermined address such as lower four (4) bytes and the Column side decoder 11C also decodes a predetermined address such as upper four (4) bytes.

Figure 5:
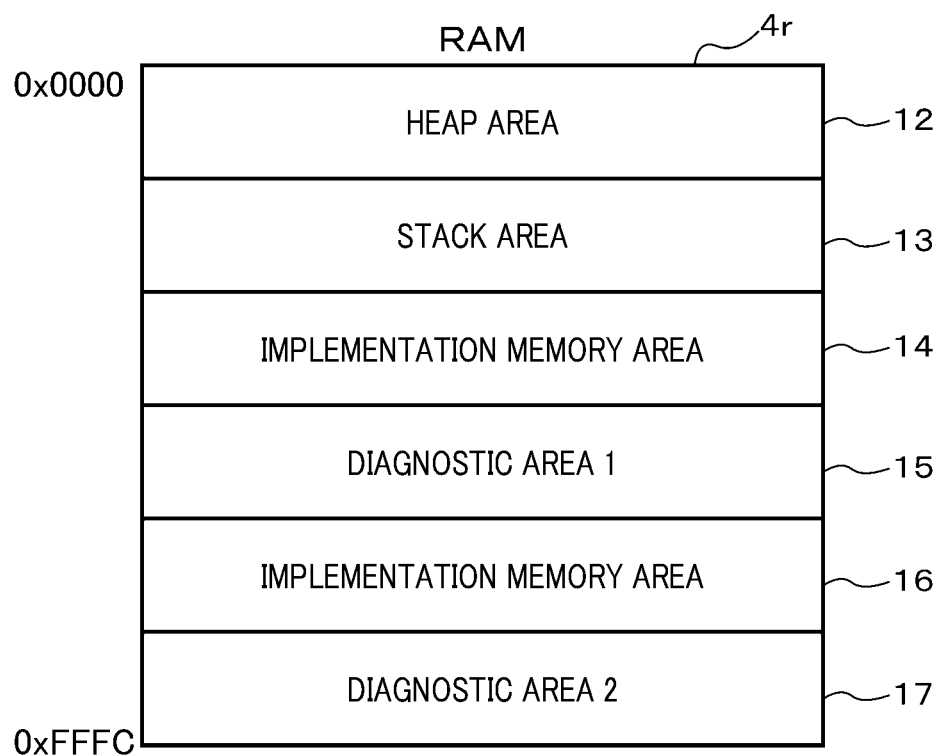
FIG. 5 is one example of an address map.

The address map of RAM 4r in FIG. 5 is sixty-four thousand (64k) bytes and has a heap memory area 12, a stack memory area 13, an implementation memory area 14 and 16, a first diagnostic area of (sequence monitor1, memory and bus) 15 and a second diagnostic area of (sequence monitor2, memory and bus) 17. The controlling program for controlling the apparatus such as the industrial products for acting the PLC 1 is installed in the implementation memory area 14 and 16. The memory 4 has a flush RAM, which is not shown in drawings, and the controlling program is installed in the flush RAM and such controlling program is rewritten to the implementation memory area 14 and 16.

Though the first diagnostic area of (sequence monitor1, memory and bus) 15 and the second diagnostic area of (sequence monitor2, memory and bus) 17 are positioned below the implementation memory area 14 and 16 respectively in FIG. 5, the first diagnostic area of (sequence monitor1, memory and bus) 15 and the second diagnostic area of (sequence monitor2, memory and bus) 17 could be located any space in RAM 4r. The number of the diagnostic areas 15, 17 are not limited in two (2) but may be one (1) or more than three (3).

The diagnostic operation of the present disclosure is explained hereinafter. The diagnostic program sequence of the microcomputer 2A shown in FIG. 6 initializes the monitor value in the storing area for monitoring value to the predetermined pattern (S1). Then, the diagnostic program sequence reads the monitor value in the storing area for monitoring value 15 and calculates the monitoring value by using the preset equations (S2). The diagnostic program sequence writes the functional calculation results as the monitoring value in the same address where the monitoring value is read (S3).

Figure 6:
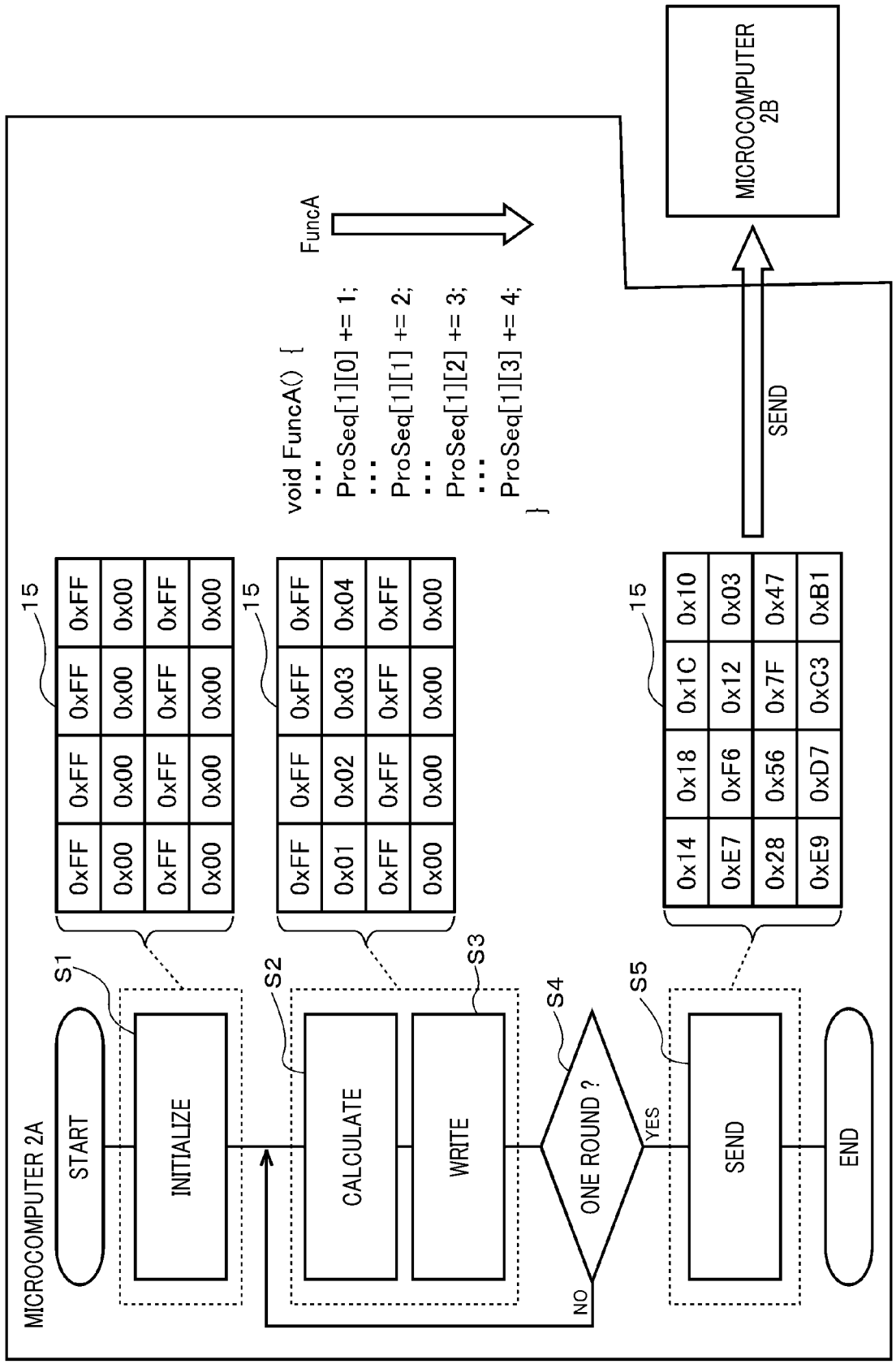
FIG. 6 is a flow chart explaining a flow of a diagnostic program sequence of a CPU.

The example shown in FIG. 6 explains the functional results which adopts the equation FuncA on the monitoring value in the two-dimensional arrangement of [1][0]-[1][3] of the storing area for monitoring value 15. The equation FuncA may be decided case by case, so that the equation of FuncA of FIG. 6 is different from that of FIG. 3. The equation of FuncA of FIG. 6 adds 1, 2, 3 and 4 on the initial value of the monitoring value respectably. The calculated result is installed in the same address where the monitoring value is read. The monitoring value does not have to been read from the first address of the storing area for monitoring area 15 but could be varied each time of the proceeding of the diagnostic program sequence. For example, a resistor adding four (4) on the address when the program sequence is proceeded could be used.

Whether or not the diagnostic program sequence completes one round is decided in a step S4. The definition of "one round" includes one-time completing the diagnostic program sequence as well as a plurality of times completing. When the diagnostic program sequence starts from the storing area for monitoring value of [1][0]-[1][3], for example, such diagnostic program sequence ends at the storing area for monitoring value of [0][0]-[0][3]. The diagnostic program sequence continues until the end of the one round.

After the diagnostic program sequence completes one round, the microcomputer 2A sends the monitoring value in the storing area for monitoring value to microcomputer 2B (S5) as a calculated result. The monitoring value is sent via the communication circuit 6 by using UART (Universal Asynchronous Receiver Transmitter), for example. As shown in the embodiment of FIG. 6, the monitoring value of the storing area for monitoring value 15 is changed from the initial stage (upper table) to that of the calculating stage (middle table) and to that of the completing stage (lower table). Meanwhile, the microcomputer 2B does the same routine shown in FIG. 6 parallelly and simultaneously and send the calculated result, e.g. the monitoring value in the storing area for monitoring value, to microcomputer 2A.

Figure 7:
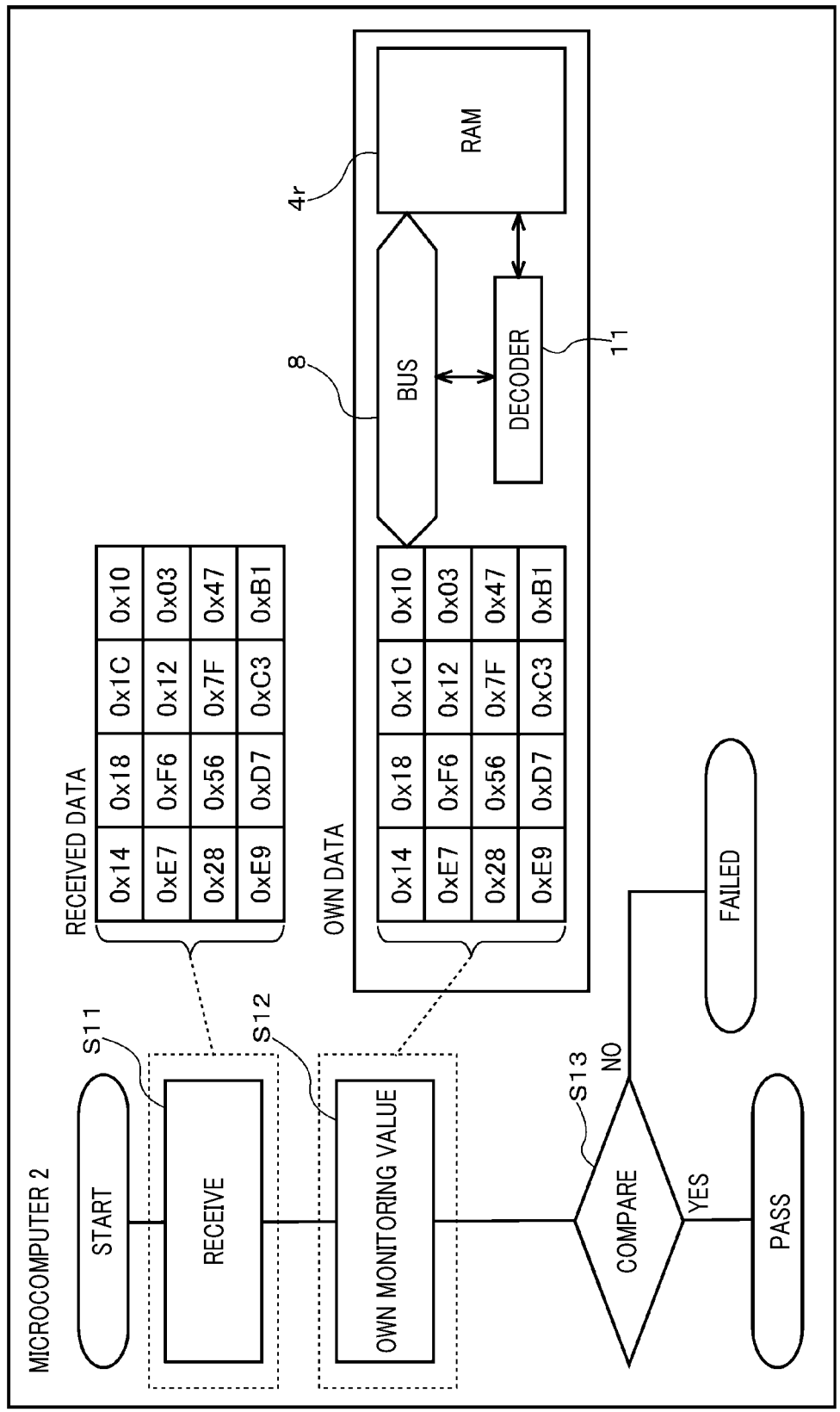
FIG. 7 is a flow chart explaining a flow of a diagnostic program sequence of a CPU of a receiving microcomputer.

As shown in FIG. 7, when the receiving microcomputer 2 receives the calculated result (S11), such receiving microcomputer 2 reads the monitoring value from its own storing area for monitoring value (S12) and compares the received result to the own monitoring value (S13). In the case the receiving microcomputer 2 fines both values are identical, the result of the diagnosis is "Pass", on the other hand in the case the receiving microcomputer 2 fines the difference between the received result and the own monitoring value, the result of the diagnosis is "Failed". Though the above-mentioned embodiment explains the monitoring value in the first storing area for monitoring value 15, the same kind diagnostic program sequence is applied on that in the second storing area for monitoring value 17.

Figure 8:
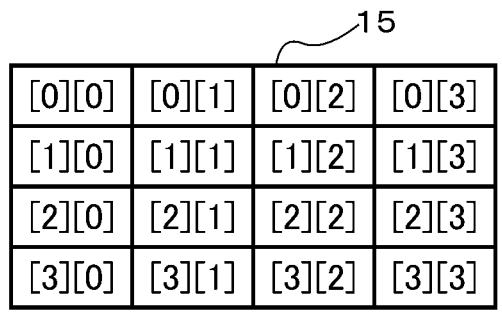
FIG. 8 shows the storing area for monitoring value when a diagnostic result is "Pass".
Figure 9:
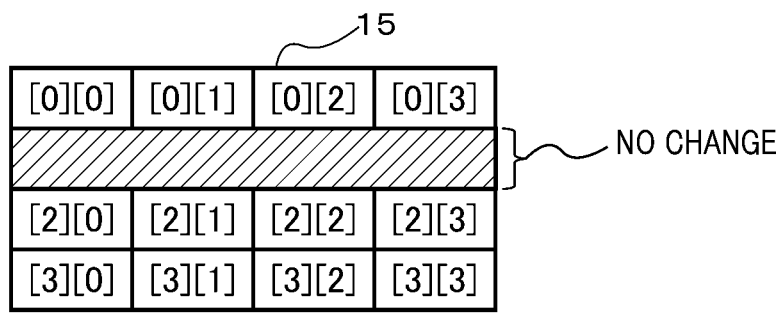
FIG. 9 shows a one example of the storing area for monitoring value when a diagnostic result is "Failed".
Figure 10:
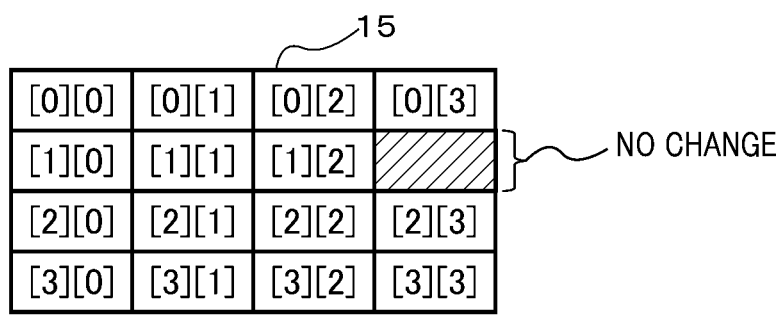
FIG. 10 shows another example of the storing area for monitoring value when a diagnostic result is "Failed".

FIG. 8 shows the storing area for monitoring value 15 when the result of the diagnostic is "Pass" and, therefore, the monitoring values are identical. FIGS. 9 and 10 show the storing area for monitoring value 15 when the result of the diagnostic is "Failed". The case the continuing four (4) bytes are not changed as shown in FIG. 9, it is presumed there is some error in the calculation of the diagnostic program sequence. The case only one (1) byte is not changed as shown in FIG. 10, the aberration in the RAM 4r, the data bus 8 or the address decoder 11 is presumed.

As explained above, each of the microcomputers 2A and 2B for the PLC 1 of the present disclosure has the CPU 3 and the memory 4 and runs the same controlling program as well as the same diagnostic program sequence parallelly and simultaneously. After the CPU 3 of the microcomputer 2 writes the calculated result in the predetermined area of the storing area for monitoring value 15, 17, such CPU 3 send the same calculated result to the other one of the microcomputers (receiving microcomputer) 2. The CPU 3 of the receiving microcomputer 2 makes a diagnosis for finding whether or not the received result is identical with its own calculated result.

In the case the CPU 3 of the receiving microcomputer 2 finds the identical, the calculation of the diagnostic program sequence by the CPU 3 as well as the hardware of the RAM 4r, the bus 8 and the address decoder 11 work normal. On the other hand, in the case the CPU 3 of the receiving computer 2 finds the difference, the aberration is presumed. In the case the difference is fined only a part in the storing area for monitoring value 15, 17, the aberration may be occurred in the hardware, and in the case the difference is fined in the continuing area of the storing area for monitoring value 15, 17, the aberration may be in the calculation of the diagnostic program sequence.

As the storing area for monitoring value 15, 17 of the present disclosure is sixteen (16) bytes, such area could be arranged 4×4, so that the diagnosis could be made from MSB to LSB of the date bus 8 and the RAM 4r.

As the diagnostic program sequence of the present disclosure is varied every four (4) bytes in the storing area for monitoring value, a multiple of diagnosis could be achieved.

The present invention should not be limited by the above-described disclosure, but has any modifications. The arrangement of the microcomputer 2 including the CPU, the hardware, and the outside circuit 9(1), 9(2) is not limited by the arrangement of FIG. 1. The size as well as the address map of the RAM 4r is not limited by those shown in FIG. 4. The size of the data bus 8 may be eight (8) bits, sixteen (16) bits, sixty-four (64) bits, or more than sixty-four (64) bits. The PLC 1 is one example of the controlling apparatus, the present invention may be used for the controller for an industrial robot. The memory map of the RAM 4r may be varied dynamically. In the case the memory map of the RAM 4r is changed dynamically, a diagnosis could be given in the entire area of the RAM 4r. A common memory both the microcomputers 2A and 2B could access may be used for the communication between the microcomputer 2A and the microcomputer 2B.

What is claimed is:

1. A controlling apparatus for an industrial product, the controlling apparatus comprising:
    a plurality of microcomputers each including a central processing unit (CPU) and a memory, each CPU executing a same controlling program in parallel and simultaneously, and each of the plurality of microcomputers executes a same diagnostic program sequence in parallel and simultaneously, so that each CPU of each of the plurality of microcomputers performs:
        storing a calculated result of the executed diagnostic program sequence in a predetermined area of a storing area for monitoring a value in the respective memory,
        transmitting the calculated result of the executed diagnostic program sequence to a receiving microcomputer of the plurality of microcomputers, and
        comparing the received calculated result of the executed diagnostic program sequence, which is received from another microcomputer of the plurality of microcomputers, to the calculated result of the diagnostic program sequence stored in the predetermined area of the storing area for monitoring the value of the memory to perform diagnostics,
    wherein:
    a size of the storing area of each memory is $4^n$ bytes, where n is a natural number,
    the diagnostic program sequence includes a plurality of equations a result of each of which is stored in a corresponding area of the storing area, and
    each of the plurality of equations is different from each other so that the diagnostic program sequence is varied.
2. The controlling apparatus according to claim 1, wherein:
    a first equation of the plurality of equations includes multiplying values in one corresponding area of the storing area by a first value, and
    a second equation of the plurality of equations includes multiplying values in another corresponding area of the storing area by a second value, which is different than the first value.

* * * * *